United States Patent Office 3,476,551
Patented Nov. 4, 1969

3,476,551
PROCESS FOR TREATING METALS
Frederick A. Lowenheim, Plainfield, N.J., assignor to M & T Chemicals Inc., New York, N.Y., a corporation of Delaware
No Drawing. Filed Apr. 21, 1966, Ser. No. 544,117
Int. Cl. C22b 25/06
U.S. Cl. 75—98                                            6 Claims

ABSTRACT OF THE DISCLOSURE

A process is provided for separating the aluminum content of objects containing both tin and aluminum by contacting the objects with an aqueous solution of an alkali metal hydroxide under reducing conditions to precipitate aluminum hydroxide, and with substantially no loss of the alkali. Further, the process includes removal of the precipitated aluminum hydroxide from the reacting environment by removing a portion of the aqueous solution with the precipitate therein, separating the two and returning the separated solution to the reacting environment. The process applies specifically to tin-bearing aluminum-ended cans and includes contacting the cans with the aqueous solution for a period of time sufficient to separate the aluminum ends from the can bodies.

---

This invention relates to a novel process for treating metals. More specifically it relates to a process for separating aluminum from a composite containing an aluminum-containing portion and a tin-containing portion.

As is well known, steel is often used in the form of a sheet which is coated with a layer of tin. This tin-plate is commonly fabricated into various containers, typically so-called tin cans. The by-product scrap from this and other similar operations contains such a high content of tin that it cannot economically be discarded. Furthermore, the steel contained in the scrap cannot commercially be reclaimed without treatment thereof to remove the adhering coating of tin because the tin embrittles the steel upon remelting.

Accordingly, it has been common to subject tin-plate scrap to a detinning operation wherein the tin may be recovered. Commonly, this is done by chemical treating which permits the recovery of steel containing little or no tin, and simultaneously the recovery of tin, usually in the form of a solution of a tin chemical, e.g. sodium stannate.

It has recently become common to fabricate containers from a tin-plated steel body, usually cylindrical, and an aluminum end. Commonly the aluminum end may be formed of a circular piece of aluminum which has been placed over the end of the typically cylindrical can and crimped into position on the end of the cylindrical side wall, with simultaneous formation of bead or ridge of aluminum at each of the ends of the side wall of the can. This has been found to permit attainment of cans characterized by ease of opening—particularly because the alumium end may be more readily perforated than an end formed of tin-plated steel.

Treatment of scrap tin-plate steel cans bearing aluminum ends by the standard prior art proceses adapted to recover the tin content has proven to be highly unsatisfactory. The reagents employed, typically sodium hydroxide in concentration of 20 g./l.–200 g./l., say 60 g./l., together with an oxidizing agent under the conditions of operation, react simultaneously with the aluminum and the tin thereby forming a solution containing both aluminum and tn. The dissolution of the aluminum has yielded solutions containing aluminum and tin which are extremely difficult to separate economically by subsequent steps. It has not heretofore been possible either separately, in a first step, to remove aluminum or to effect detinning under conditions deemed satisfactory to those skilled-in-the-art without attendant contamination with aluminum. Furthermore simultaneous dissolution of aluminum and tin requires exceedingly large consumption of caustic with resulting uneconomical operation because of caustic losses.

It is an object of this invention to provide a novel process for treating composite bodies containing an aluminum-containing portion and a tin-containing portion to separately recover aluminum values and tin values. Other objects will be apparent to those skilled-in-the-art on inspection of the following description.

In accordance with certain of its aspects, the process of this invention for separating aluminum values from a composite having an aluminum-containing portion and a tin-containing portion may comprise maintaining said composite under reducing conditions in contact with an aqueous solution containing 10 g./l.–280 g./l. of alkali metal hydroxide for a period of time sufficient for the aluminum-containing portion to react with said aqueous solution and to be separated from said tin-containing portion and to leave behind a de-aluminized tin-containing portion of said composite; and separating said tin-containing portion of said composite from said aqueous solution.

The composites which may be treated in practice of the process of this invention may include metal bodies bearing an aluminum-containing portion. The aluminum-containing portion may have been fabricated from pure aluminum, substantially free of alloying metals, or it may have been fabricated of aluminum alloys such as: aluminum 5052 which contains about 2.5% magnesium and 0.25% chromium; aluminum 5086 which contains about 0.45% manganese, 4.0% magnesium, and 0.1% chromium; aluminum 5154 which contains about 3.5% magnesium and 0.25% chromium; etc. The process of this invention may also be employed to separate mixtures of tin-containing portions and aluminum-containing portions, e.g. mixed aluminum and tin-plate scrap.

The composite may also include metal bodies bearing, in addition to the aluminum-containing portion, a tin-containing portion. The tin-containing portion may be pure tin metal or a thin layer of tin on a thicker basis metal. The basis metal may typically be steel. In a typical embodiment, the composite may be a container or tin can formed of a typically cylindrical portion of 0.1 mm.–1.5 mm., say 0.13 mm. thick steel bearing on at least one side thereof a layer of 0.0001 mm.–0.0015 mm., say 0.0003 mm. of tin. Typically the tin may be present in amount of 0.20%–1.55% by weight of the steel.

The composite may bear, on at least one end thereof, a cap or end of aluminum, typically having a thickness of 0.30 mm. This aluminum end may be affixed to the remaining portion of the composite, e.g. the can body, by crimping with resultant formation of a crimped seam or bead at the outer end of the preferably cylindrical end of the can body, which bead may normally have been subjected to severe stress during fabrication. Frequently the can may bear a lacquer on the tin portions thereof or on the aluminum bead immediately adjacent to the can ends, or both.

In practice of the process of this invention, the composites may be maintained in contact with an aqueous solution containing 10 g./l.–280 g./l., say 50 g./l. of alkali metal hydroxide. Preferred alkali metal hydroxide may include sodium hydroxide or potassium hydroxide.

Typically alkali metal hydroxide may be present in amount of 10 g./l.–200 g./l., say 50 g./l. for sodium hydroxide. When potassium hydroxide is employed, it may be present in amount of 14 g./l.–280 g./l., preferably 42 g./l.–112 g./l., typically 75 g./l.

It is a particular feature of the process of this invention that the dissolution of aluminum, with no attendant simultaneous dissolution of tin be carried out under reducing conditions. Preferably this may be effected by using a bath containing substantially only the alkali metal hydroxide and water (plus the reaction products) with no added oxidizing agent. During the reaction, as set forth infra, nascent hydrogen may be generated and the presence thereof may be sufficient to provide the reducing conditions needed for control of the reaction. Temperature of operation may preferably be 75° C.–105° C., say 90° C.–100° C., say 95° C.

During practice of the process of this invention, it may be found that the aluminum may be readily dissolved from the composite, typically a tin-plate can body having an aluminum end, possibly according to the following reaction:

$$2Al + 2NaOH + 2H_2O \rightarrow 2NaAlO_2 + 3H_2 \qquad (I)$$

Dissolution of aluminum may be accompanied by a simultaneous precipitation of aluminum hydroxide, possibly according to the following reaction:

$$2NaAlO_2 + 4H_2O \rightarrow 2Al(OH)_3 + 2NaOH \qquad (II)$$

It will be apparent to those skilled-in-the-art, that Equations I and II may be added to give Equation III which represents the total overall reaction:

$$2Al + 6H_2O \rightarrow 2Al(OH)_3 + 3H_2 \qquad (III)$$

As the reaction proceeds, aluminum may readily be dissolved from the composite under reducing conditions in the presence of nascent hydrogen liberated during the reaction and aluminum hydroxide precipitates from the aqueous solution. The aluminum hydroxide may be recovered and, if desired, further processed or marketed as such. Under the conditions of operation, substantially little or no tin, e.g. less than 15%, and typically less than about 5% of the amount present may be removed from the composite.

It is a particular feature of the process of this invention, as is aparent from inspection of Equation III supra, that no caustic is consumed during operation as the aluminum is converted to aluminum hydroxide under reducing conditions and in the presence of nascent hydrogen. In practice, an equilibrium is achieved, and loss of caustic may be limited mainly to that caused by drag-out on the tin-containing composite.

Reaction may be carried out on a given composite for 20–300 minutes, say 240 minutes. It is a particular feature of this invention that where the composite is a tin-plated steel can bearing one aluminum end, it may be possible to effect complete dissolution of aluminum by maintaining the can in contact in the caustic solution for 120–300 minutes, say 240 minutes. As reaction proceeds the caustic may unexpectedly be found to attack the bead or ridge on the aluminum along the line where the end is joined to the can, at a high rate. As dissolution along this line continues, the aluminum end may become detached from the can body; and separation of the aluminum-containing portion and the tin-containing portion may be effected without complete dissolution of the aluminum from the former. If reaction be carried out for 40–120 minutes, say 90 minutes, the ends may be sufficiently loose so that they may be readily vibrated or jarred loose from the can body. This may be effected conveniently by rotating the entire mass in a drum during the reaction and recovery of the aluminum ends, e.g. by permitting them to fall through slots in the drum wall or by otherwise segregating them.

It is highly preferred to separate the precipitated aluminum hydroxide from the aqueous solution as the former is generated. This may readily be accomplished by: removing a portion of the aqueous solution from the main body thereof; separating from the aqueous solution the aluminum hydroxide together with any other solid including precipitated lacquer and pigments; and returning the said portion, free of aluminum hydroxide, to the main body of solution.

At the end of the desired time, typically 120–300 minutes, say 240 minutes, the de-aluminized tin-containing portion of the composite may be separated from the aqueous solution containing the aluminum hydroxide and/or aluminum metal.

Preferably the de-aluminized scrap, typically a tin-bearing steel can body, may be further subjected to detinning. This may be carried out for example by contact with aqueous caustic solution under detinning conditions. Detinning may preferably be effected by contact under oxidizing conditions with aqueous solution containing a soluble caustic, preferably sodium hydroxide, potassium hydroxide, or equivalent caustic. Preferably the caustic will be sodium hydroxide in amount of 15 g./l. to 300 g./l., preferably 100 g./l. to 220 g./l., say 150 g./l. Equivalent amounts of other soluble caustic materials may be employed. Oxidizing agents such as 10 g./l.–40 g./l. of sodium nitrite or 25 g./l.–50 g./l. of sodium nitrate may preferably be present in the detinning solution.

Detinning may be carried out at temperature of 25° C.–100° C., preferably 75° C.–100° C., say 95° C. for 90–240 minutes, say 150 minutes.

At the end of this time, the detinning operation may be completed and the scrap separated from the solution by either draining the soltuion from the scrap or more commonly by lifting the detinned tin plate scrap from the solution.

The solution containing the tin which has been removed from the plate may be treated in the desired manner to recover tin therefrom. The solution may however be reused, in manner similar to that hereinbefore described, if desired until the desired concentration of tin reaches a level at which it may be economically recovered.

In practice of the detinning operation, wetting agents may be present in the detinning solution to facilitate contact thereof with the plate. Typical of such wetting agents may be sodium lauryl sulfate, etc. present in amount of 0.1 g./l. to 2 g./l., say 1 g./l.

Practice of this invention may be observed from the following illustrative examples wherein all parts are parts by weight unless otherwise stated.

EXAMPLE I

Aluminum-ended "tin cans," used as the composite in this example, were formed of a steel sheet of 0.13 mm. thickness coated on the inner and outer surfaces with 0.0003 mm. of tin. Each can was 65.4 mm. in diameter and 122 mm. in length. The surfaces each bore a standard clear U.F. Epoxy commercial lacquer.

On one end of each can was an end-piece made of 5052 alloy aluminum containing about 97% aluminum, 2.5% magnesium, and 0.25% chromium. The aluminum end was crimped to the cylindrical can body along one circular end. The average can body contained about 35 parts of steel, 0.15 parts of tin, and 6.5 parts of aluminum.

About 25 of these cans were placed within a wire basket and the assembly was placed in 50,000 parts of aqueous caustic solution containing 75 g./l. of sodium hydroxide heated to 93° C.±2.5° C.

Aluminum was dissolved from the cans forming sodium aluminate and thereafter, aluminum hydroxide as set forth supra in Equations I and II. As the lacquer and aluminum metal was dissolved from the cans, the aqueous solution was continuously pumped through a filter to remove aluminum hydroxide and lacquer. When the aluminum was totally dissolved from the cans, the cans were removed from the aqueous solution.

During the preliminary runs sodium hydroxide was added to maintain desired level as determined by analysis. After about twenty runs, at which time approximately five hundred cans had been de-aluminized, the solution was found to have reached equilibrium. At this point, it analyzed 175 g./l., total NaOH; 47 g./l. free NaOH; and 60 g./l. aluminum.

In practice of the process of this invention, 170 cans were treated in seven runs. During the course of these runs, 170 aluminum ends (each weighing 6.2 grams) were dissolved. The 1050 g. of aluminum yielded 2900 g. of aluminum hydroxide (theo. 3030 g.). In this example, samples of the steel can bodies were analyzed before treatment and found to contain 0.47% Sn. Thus there was substantially no dissolution of tin during the removal of aluminum.

From the above example of a preferred embodiment, it will be apparent that the process of this invention permits treatment of a composite to separate the aluminum-containing portion from the tin-containing portion.

Although this invention has been disclosed by reference to various specific examples, it will be apparent to those skilled-in-the-art that various modifications and changes may be made thereto which fall within the scope of this invention.

I claim:

1. In a process for separating the aluminum content from objects containing both tin and aluminum with substantially no effect upon said tin content, the steps which comprise contacting said tin and aluminum-containing objects in the absence of any oxidizing agents with an aqueous solution consisting essentially of alkali metal hydroxide wherein said alkali metal hydroxide is present in a concentration of from 10 g./l.–280 g./l., limiting said contacting step to a temperature of between about 75° C. to 105° C. for avoiding substantial reaction of said tin content with said aqueous solution, continuously reacting said aluminum content with said aqueous solution and continuously precipitating aluminum hydroxide therein, removing a portion of said aqueous solution with said precipitated aluminum hydroxide contained therein from said reacting step, continuously separating said aluminum hydroxide precipitate from said removed portion of said aqueous solution, and continuously returning said removed portion to said contacting step with substantially no loss of said alkali metal hydroxide.

2. A process as described in claim 1 in which said alkali metal hydroxide is selected from the group consisting of sodium hydroxide and potassium hydroxide and mixtures thereof.

3. A process as described in claim 1 in which said objects are maintained in contact with said aqueous solution containing said alkali metal hydroxide for between about 20–300 minutes.

4. A process as recited in claim 1 in which said objects with said tin content are removed from said aqueous solution after removal therefrom of said aluminum content.

5. A process as recited in claim 1 in which said objects are tin-bearing aluminum ended cans and in which said reacting step is maintained for a period of time sufficient to separate the aluminum ends of said cans, and which includes the step of removing said aluminum ends from said aqueous solution.

6. A process as recited in claim 1 in which said objects are tin clad steel objects with aluminum portions connected thereto.

References Cited

UNITED STATES PATENTS

| 2,355,777 | 8/1944 | Benson et al. | 75—98 |
| 2,839,370 | 6/1958 | Foulke et al. | 156—22 |
| 3,022,160 | 2/1962 | Brandt | 75—97 |

OTHER REFERENCES

Baker: Industrial and Engineering Chemistry, vol. 27, No. 11, November 1935, pp. 1358–1364.

L. DEWAYNE RUTLEDGE, Primary Examiner

T. R. FRYE, Assistant Examiner

U.S. Cl. X.R.

75—101, 121